Figure 1:
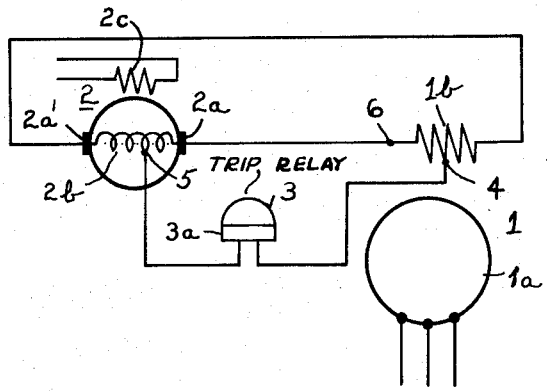

March 31, 1964     E. TARJAN ETAL     3,127,541

PROTECTIVE SYSTEM FOR SYNCHRONOUS ELECTRICAL MACHINES

Filed Oct. 14, 1960

INVENTORS
Endre Tarjan
Adolf Kolar
BY Pierce, Schiffler & Parker
Attorneys

United States Patent Office 3,127,541
Patented Mar. 31, 1964

3,127,541
PROTECTIVE SYSTEM FOR SYNCHRONOUS
ELECTRICAL MACHINES
Endre Tarjan, Wettingen, Aargau, and Adolf Kolar, Neuenhof, Aargau, Switzerland, assignors to Aktiengesellschaft Brown, Boveri & Cie, Baden, Switzerland, a joint-stock company
Filed Oct. 14, 1960, Ser. No. 62,790
Claims priority, application Switzerland Oct. 29, 1959
4 Claims. (Cl. 317—13)

This invention relates to a protective system for synchronous electrical machines such as synchronous generators and synchronous motors, and more particularly to the protection of the excitation winding on such machines, which are usually carried by the rotating member of the machine, against disconnection and inter-turn short-circuits.

There are many known arrangements relating to the protection of these excitation windings against the faults mentioned. However, they are either very expensive to manufacture, or are not sufficiently sensitive, or are applicable only in special constructions. For example, the use of protective resistance relays is known which monitor the resistance of the exciter circuit. The voltage of the exciter generator and the exciting current are supplied thereto. Upon a disconnection, the resistance rises sharply and induces the protective relay to respond which then releases the master switch and the magnetic field switch. Such an arrangement has the disadvantage that it must be adapted to fluctuating service conditions. The excitation current varies very sharply according to the idle load requirements of the synchronous machine and can even become zero from an operational viewpoint. Thus special requirements are necessary in particular to the current disconnection. With an exciting current of zero, there always exists the danger of instability in the relay since under this condition neither current nor voltage is applied to the relay windings. Therefore, it is at least necessary to provide a time delay characteristic in the relay so that sudden changes in excitation do not effect an undesired release since even in this case, the resistance measurement can be falsified by transient phenomena. Thus the relay cannot be adjusted too sensitively and the consequence is that shunts in only one winding turn cannot induce the relay to respond.

Protective systems which are comparatively sensitive are feasible only in special constructions of the devices known hitherto. In dual synchronous generators, i.e. in arrangements of two such generators with separate excitation windings that are directly tripped in parallel, it is feasible to provide a differential protective device which compares the excitation currents or excitation voltages of the two excitation windings. However, this is obviously not feasible for use in individual generators.

The voltage, as a measuring magnitude has also been used for the protection of the rotor excitation winding in order to protect the same against the absence of the voltage upon a possible disconnection. However, a voltage responsive relay cannot possibly provide protection against inter-turn short-circuits in the excitation winding itself since the voltage changes only a very small amount when an inter-turn short-circuit appears in the winding. The voltage responsive relay protects against a disconnection only if the disconnection point lies electrically in front of the connection point of the voltage relay, thus for example in the winding of the exciter generator. However, it does not protect against disconnections in the excitation winding on the rotor of the main synchronous generator or motor.

Hence, the problem is to obtain a protective device which will be effective should there be a disconnection in the excitation circuit of the machine and should there be an inter-turn short-circuit in the excitation winding itself wherein the sensitivity is high for all types of synchronous machines and switches without the necessity for providing a lag in the response time of the releasing action.

In accordance with the invention, the excitation winding of the synchronous electrical machine is protected against possible disconnection or inter-turn short-circuits by connecting a voltage responsive protective device between two points of the excitation circuit which have equal voltage values under normal operating conditions. However, should there be a disconnection of the excitation circuit or should an inter-turn short-circuit develop in the excitation winding of the synchronous machine, the said two points will then exhibit a difference in potential which then becomes effective to actuate the protective device.

The invention is predicated upon the concept that a voltage is produced in the armature winding of the associated exciter generator which is used to supply the excitation current to the excitation i.e. the field winding of the main synchronous machine, this voltage progressively increasing from turn to turn in the armature winding of the exciter generator and being diminished in a progressive manner in the load circuit, thus mainly in the excitation winding of the synchronous machine. Thus each point in the armature winding of the exciter generator will exhibit a voltage value that will be in conformity with the same voltage value at some corresponding point in the excitation winding. The operating coil of a voltage sensitive relay, for example, can then be connected between two such points which normally have the same voltage value. If a defect should then appear in the excitation circuit, the voltage distribution will change and hence the two points selected will no longer exhibit the same voltage value. Rather one point will show a voltage value different from the other and this voltage differential then causes a current to flow through the operating coil of the relay which causes it to respond. Under normal operating conditions, stabilization of voltage at the two points selected is independent of the degree to which the excitation winding is energized, and hence the protective device is satisfactory under all operating conditions of the synchronous machine. Even slight voltage changes indicate, therefore, a fault. Hence, the protective device can be set to a high degree of sensitivity and requires no time delay characteristic.

The following detailed description is directed to different embodiments of the inventive concept and these are illustrated in the accompanying drawings.

Figure 2:
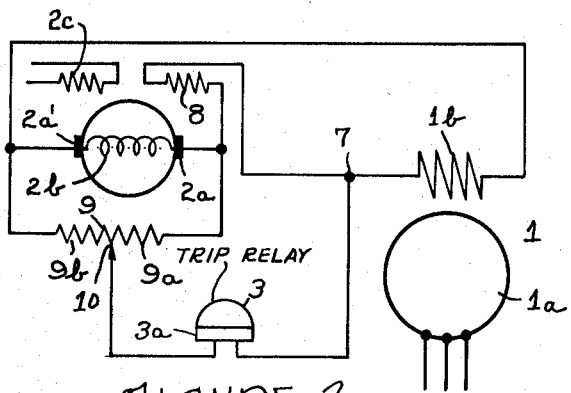
Figure 3:
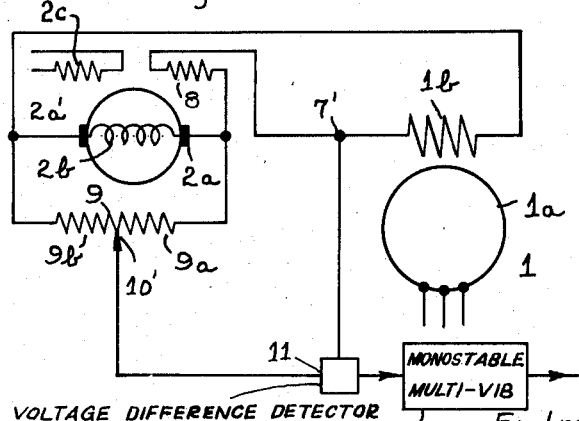

FIG. 1 of the drawings is a schematic electrical circuit diagram showing one embodiment of the invention which includes a voltage responsive relay connected to selected points normally having the same voltage in the armature winding of the exciter generator and in the usually rotatable excitation winding of the alternating current synchronous generator or motor;

FIG. 2 is also an electrical schematic of a different embodiment of the inventive concept which does not require tapping into the excitation and armature windings of the synchronous machine and exciter generator respectively in order to establish the two voltage comparison points; and FIG. 3 is likewise an electrical schematic showing a third embodiment of the invention which is somewhat similar to FIG. 2 but utilizes an electronic switch such as a monostable multivibrator for the voltage responsive element.

With reference now to the drawings and to FIG. 1 in particular, the alternating current synchronous machine to be protected is indicated by numeral 1. It includes a normally stationary three-phase armature element 1a and a rotary field element which is provided with an excitation winding 1b which, in accordance with the invention, is to be protected. The excitation winding 1b receives direct current from an exciter generator 2, the excitation winding being connected in the usual manner to the output brushes 2a, 2a' on the rotating armature of this generator. The stationary field element of the exciter generator is indicated at 2c and the rotary armature winding is indicated at 2b. The voltage responsive relay is shown at 3 and its operating coil 3a is connected between a selected point 4 in the excitation winding 1b of the synchronous machine and a selected point 5 in the armature winding 2b of the exciter, the points 4 and 5 being so chosen as to have the same potential during normal operating conditions of the excitation circuit and hence under these conditions the operating coil 3a of the voltage relay remains in a non-responsive state. In other words, under normal conditions, the voltage generated in the armature winding 2b between the connecting point 5 and the brush 2a is always equal to the drop in voltage in the excitation winding 1b between the terminal 6 at one end of this winding and the tap point 4 therein.

As indicated, response of the relay 3 will occur only if a difference in voltage arises between the two points 4 and 5. This voltage differential will appear upon a disconnection anywhere in the excitation circuit or upon the occurrence of an inter-turn short-circuit in the excitation winding 1b. The relay response is used to disconnect hte power switch and the magnetic field switch, neither of which is shown in the drawings.

In the embodiment illustrated in FIG. 1, a special tap must be provided within the armature winding 2b of the exciter generator and also within the excitation winding 1b of the synchronous machine in order to establish the voltage comparison points 4 and 5 since such tapping points do not ordinarily exist. However this does not create any great difficulties in the production of these two windings although it does require special construction. The necessity for tapping into these windings can be avoided by a modification in the circuit connections, and such a modification is illustrated in the embodiment of FIG. 2. Assuming that the direct current exciter generator is provided with commutating poles, the desired excitation winding monitoring circuit can be set up by selecting as one of the normally equal voltage points, a point between the commutating pole winding and the excitation winding of the synchronous machine. The other equal-voltage point can be obtained from a tap on a potentiometer connected in parallel with the armature winding of the exciter generator. Thus in FIG. 2, one of the tap points is indicated at 7 and is seen to be located between one end of the commutating pole winding 8 of the exciter generator and one end of the excitation winding 1b of the synchronous machine. Tap point 7 is connected to one terminal of relay coil 3a. A potentiometer winding 9 is connected in parallel with the armature winding 2b of the exciter generator, i.e. across the brushes 2a, 2a' and a movable tap or slidewire 10 along the potentiometer winding which constitutes the other equal-voltage point is connected to the other terminal of relay coil 3a. The voltage drop in the commutating pole winding 8 must now be equal to the voltage drop in that part 9a of the potentiometer winding which lies between the movable tap 10 and brush 2a. The magnitude of the voltage drop across winding part 9a can be varied by changing the location of slidewire 10 along winding 9 so that it becomes easy to locate the point which, under normal operating conditions, exhibits the same voltage as point 7.

If desired, a relay of the moving coil type can be used to serve the purpose of relay 3. This type of relay responds to very small differences in voltage. It swings in one direction or the other dependent upon the direction of current flow through the same and can be used through its contacts to control the main switching apparatus mentioned.

In lieu of a mechanical relay, it is also possible to use relays of the electronic switching type which actuate directly the release or tripping mechanism for disconnecting the synchronous machine. Such an arrangement is illustrated in FIG. 3. The embodiment shown therein is similar to that of FIG. 2. The two points which have equal voltage values are thus indicated at 7' and 10' to distinguish them from the similar equal-voltage points 7 and 10 of FIG. 2, and are connected to a special detector circuit 11 which takes into account the fact that any differential voltage arising between points 7' and 10' may be of one polarity or the other, and produces, itself, a voltage which is always of the same polarity whenever a voltage differential appears. This voltage output from the detector circuit 11 is then applied to an electronic tipping or "flip-flop" switching unit 12 so as to cause it to be actuated and developed a voltage at its output which initiates the release of the main switching apparatus. The switching unit 12 can be constituted by a monostable multi-vibrator of known construction utilizing transistors.

In conclusion, the principal advantage of the invention lies in the fact that protection of the rotary field element of a synchronous machine against disconnections in the excitation circuit and against inter-turn short-circuits is obtained which operates without delay and can be adjusted to a high degree of sensitivity so that short-circuits within a winding can be ascertained in a very accurate manner.

We claim:

1. In a system including an alternating current synchronous machine having a stationary winding and a rotary excitation winding, and an exciter generator providing a direct current voltage output from its rotary armature which is connected to said excitation winding, said exciter generator also including commutating poles with windings thereon through which the output current of the exciter passes, an arrangement for protecting said excitation winding against disturbances due to disconnection thereof from said exciter generator or to inter-turn short-circuits within said excitation winding, comprising a voltage divider winding connected in parallel with the output voltage from the armature of said exciter generator, a tap on said voltage divider winding, a voltage responsive device and circuit means connecting said device between said tap on said voltage divider winding and a tap point on the excitation circuit located between said commutating pole winding and said excitation winding, said voltage divider tap and said tap point exhibiting like voltages only in the absence of such a disturbance thus maintaining said device in a non-responsive state.

2. A protective arrangement as defined in claim 1 wherein said voltage responsive device includes a relay of the flip-flop type.

3. A protective system as defined in claim 1 wherein said tap on said voltage divider winding is adjustable along the same to vary the voltage thereon.

4. A protective arrangement as defined in claim 2 wherein said flip-flop type relay is constituted by a monostable multivibrator.

References Cited in the file of this patent

UNITED STATES PATENTS

| 1,867,416 | Merrick | July 12, 1932 |
| 1,867,417 | Merrick | July 12, 1932 |
| 1,905,240 | Peterson | Apr. 25, 1933 |
| 2,262,651 | Re | Nov. 11, 1941 |
| 2,324,825 | Crary | July 20, 1943 |